US008641146B2

(12) United States Patent
Suzuki et al.

(10) Patent No.: US 8,641,146 B2
(45) Date of Patent: Feb. 4, 2014

(54) VEHICLE SEAT RECLINING APPARATUS (75) Inventors: Daisuke Suzuki, Kosai (JP); Daisuke Iguchi, Hamamatsu (JP); Fumisato Mase, Kosai (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 472 days.

(21) Appl. No.: 12/909,124

(22) Filed: Oct. 21, 2010

(65) Prior Publication Data
US 2011/0101754 A1    May 5, 2011

(30) Foreign Application Priority Data

Oct. 29, 2009  (JP) .................. 2009-248411
Sep. 28, 2010  (JP) .................. 2010-216761

(51) Int. Cl.
B60N 2/235    (2006.01)
(52) U.S. Cl.
USPC ................... 297/367 R; 297/367 P
(58) Field of Classification Search
USPC ........................... 297/367 P, 367 R
See application file for complete search history.

(56) References Cited

U.S. PATENT DOCUMENTS

| | | | |
|---|---|---|---|
| 5,622,407 A | | 4/1997 | Yamada et al. |
| 7,823,978 B2 * | | 11/2010 | Ishihara et al. ............ 297/367 P |
| 7,950,741 B2 * | | 5/2011 | Mitsuhashi ................ 297/367 |
| 7,950,742 B2 * | | 5/2011 | Endo et al. ................. 297/367 P |
| 7,988,233 B2 * | | 8/2011 | Yamada et al. ............ 297/367 P |
| 8,029,064 B2 * | | 10/2011 | Endo et al. ................ 297/367 R |

FOREIGN PATENT DOCUMENTS

| | | |
|---|---|---|
| EP | 1 676 502 A2 | 7/2006 |
| JP | 2004-105360 A | 4/2004 |
| JP | 2004-121508 A | 4/2004 |
| JP | 2008-18108 A | 1/2008 |
| JP | 2009-77920 A | 4/2009 |

OTHER PUBLICATIONS

European Extended Search Report, Nov. 11, 2013, 6 pages.

* cited by examiner

Primary Examiner — Anthony D Barfield
(74) Attorney, Agent, or Firm — Foley & Lardner LLP (57) ABSTRACT

A vehicle seat reclining apparatus comprises a base member to be connected to one of a seat cushion and a seat back, a rotation member which is to be connected to the other of the seat cushion and seat back, which is arranged to rotate relative to the base member and which includes an internal gear, a regulating member to regulate axial movement of the rotation member relative to the base member, and a locking setup which includes an external gear and which is arranged to move between a lock position to engage the external gear with the internal gear and an unlock position for disengagement. The base member includes an outer circumferential portion defining a circular recess, the rotation member includes an outer circumferential portion including a cylindrical portion fit rotatably in the outer circumferential portion of the base member. The outer circumferential portion of the rotation member further includes a flange portion which projects radially outwards from the cylindrical portion, which is placed axially between the regulating member and the outer circumferential portion of the base member and which includes a side surface facing away from the base member and servings as a sliding regulation surface set in sliding contact with the regulating member.

15 Claims, 6 Drawing Sheets

VEHICLE SEAT RECLINING APPARATUS

BACKGROUND OF THE INVENTION

The present invention relates to apparatus for reclining a vehicle seat designed to increase the strength and reduce the size.

A patent document 1 (JP2008-18108A) discloses a vehicle seat reclining apparatus including a frame member connected with one of a seat cushion and a seat back pivotally connected with the seat cushion, a cover or lid member which is connected with the other of the seat cushion and seat back and which is arranged to rotate relative to the frame member, and a regulating member regulating axial movement of the cover member relative to the frame member. This seat reclining apparatus further includes a lock tooth member for locking and unlocking the relative rotation of the cover member relative to the frame member, and a cam member for shifting the lock tooth member to a lock position or an unlock position.

In the case of vehicle collision, a great force is applied to rotate the seat back violently toward the front of the vehicle, relative to the seat cushion. Therefore, the seat reclining mechanism is required to have a sufficient strength. In order to increase the strength, it is necessary to increase the teeth of internal gear (module) capable of engaging with the lock tooth member by increasing the outside diameter of the cover member or to increase the wall thickness of the lock tooth member. In the case of the increase of the wall thickness of the lock tooth member, it is necessary to increase the axial length of a cylindrical portion of an outer circumferential portion of the cover member. When the cylindrical portion of the cover member is formed by drawing and the outer circumferential portion of the cover member is shaped like a flange in order to increase the axial length of the cylindrical portion without increasing the outside diameter of the cover member as in the patent document 1, it is further required to increase the axial length of the regulating member for regulating the axial movement of the cover member. A patent document 2 (JP2004-121508A) discloses similar vehicle seat reclining apparatus.

SUMMARY OF THE INVENTION

However, the regulating member is small in the thickness in the radial direction, and hence liable to bend. Therefore, when axial load is applied to the cover member, the axial displacement of the cover member may be increased, so that the reclining mechanism tends to cause unsteady movement of the seat back in the left and right direction, and to cause a decrease of the lock strength. In the case of the patent document 2, the cylindrical portion of the cover member is formed by half blanking of press forming, and the cover member is required to have a greater plate thickness to increase the axial length of the cylindrical portion. However, the increase of the thickness of the cover member causes an increase of the size of the cover member in the radial direction, and an increase of the size of the entire reclining mechanism.

A seat reclining mechanism of a patent document 3 (JP2009-077920 A) employs a regulating member (or holder) including a base end portion welded to the outside circumference of a frame member which is shaped to have no cylindrical or rim portion, to reduce the size of the frame member, and a regulating forward end portion which is bent radially inwards and arranged to be held in sliding contact with the cover member. However, in this mechanism, the cover member is liable to rotate unsteadily relative to the frame member because the cover member is held by the sliding contact with the regulating member. Moreover, sparks (such as sputter) produced by the laser welding are liable to enter the sliding contact portion between the cover member and the regulating member, and hence to deteriorate the sliding smoothness.

Therefore, it is an object of the present invention to provide a seat reclining apparatus adequate for increasing the strength and reducing the size of the seat reclining apparatus.

According to one aspect of the present invention, a vehicle seat reclining apparatus comprises: a base member adapted to be connected to one of a seat cushion and a seat back; a rotation member which is adapted to be connected to the other of the seat cushion and the seat back, which is arranged to rotate relative to the base member and which includes an internal gear; a regulating member to regulate axial movement of the rotation member relative to the base member; and a locking setup including a lock tooth member which includes an external gear capable of engaging with the internal gear. The base member includes an outer circumferential portion defining a circular recess, the rotation member includes an outer circumferential portion including a cylindrical portion which is fit rotatably in the outer circumferential portion of the base member, and which includes an inside circumferential surface formed with the internal gear. The cylindrical portion of the rotation member further includes a sliding outside circumferential surface to limit radial movement of the rotation member relative to the base member by being fit slidably in an inside circumferential surface of the outer circumferential portion of the base member, and the outer circumferential portion of the rotation member further includes a sliding side surface and a sliding regulation surface facing axially for limiting axial movement of the rotation member relative to the base member. The outer circumferential portion of the rotation member further includes a flange portion which projects radially outwards from the cylindrical portion, which is placed axially between the regulating member and the outer circumferential portion of the base member and which includes a side surface facing away from the base member and serving as the sliding regulation surface set in sliding contact with the regulating member.

DETAILED DESCRIPTION OF THE INVENTION

First Embodiment

Figure 6:
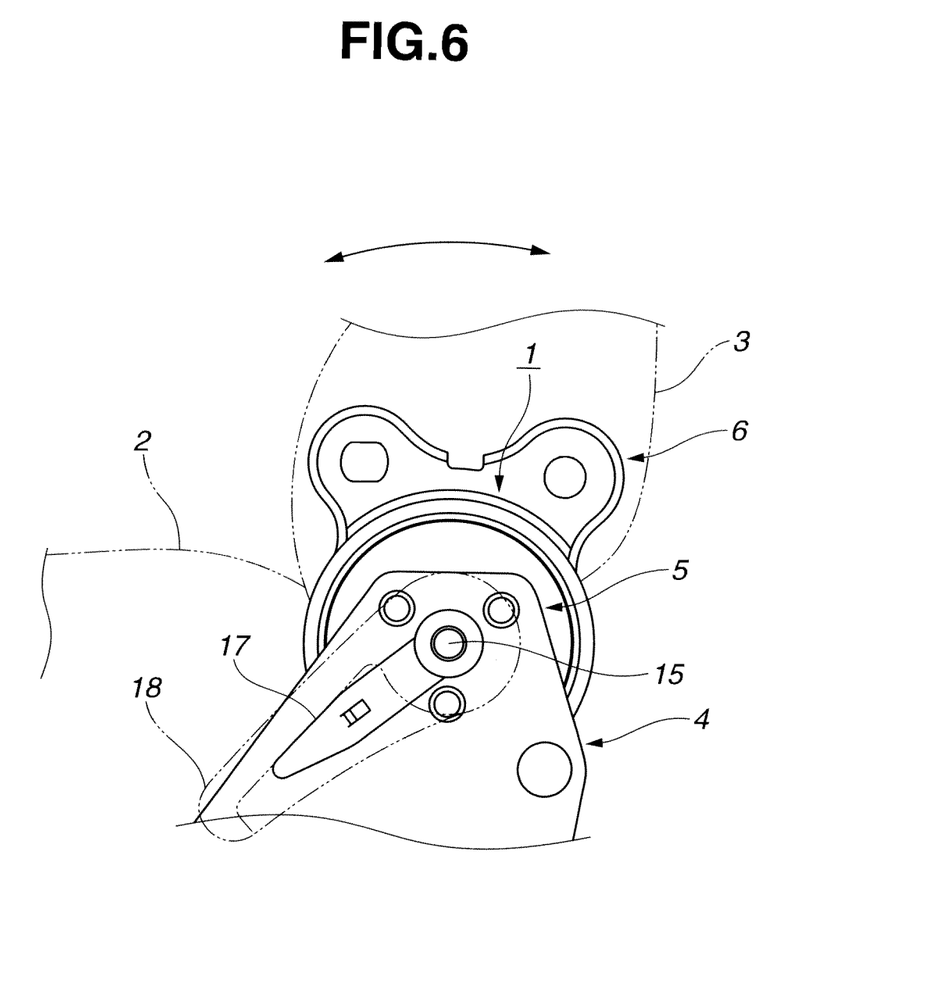
FIG. 6 is a view showing the vehicle seat reclining mechanism according to the first embodiment (or the second, third or fourth embodiment).

A vehicle seat shown in FIG. 6 includes a seat cushion 2 serving as a seat portion on which a seat occupant sits, and a seat back 3 connected with seat cushion 2 in such a rotatable manner that seat back 3 can rotate back and forth in the longitudinal direction of the vehicle. In this example, a frame member 5 serving as a base member is connected with seat cushion 2 through a base plate 4. A cover or lid member 7 (not shown in FIG. 6) serving as a rotation member is connected with seat back 3 through an arm plate 6. A spring (not shown) is provided for urging the seat back 3 in a leftward direction which is a forward direction toward the front of the vehicle, relative to the seat cushion 2.

The frame member 5 and cover member 7 are constituent members of a vehicle seat reclining mechanism 1 shown in FIGS. 2A and 2B, as explained below. As shown in FIG. 2B, frame member 5 includes a circular recess 5a formed by half blanking of a circular plate with a press. Frame member 5 includes an outer circumferential portion 5h including a rim portion 5j (such as a larger cylindrical portion) and a center portion 5s surrounded by the outer circumferential portion 5h. The rim portion (larger cylindrical portion) 5j(5h) is formed by forming the circular recess 5a. The center portion 5s includes a center wall surface 5e facing in a second (leftward) direction toward the cover member 7, and forming a bottom of the circular recess 5a. On the other hand, cover member 7 includes an outer circumferential portion 7h including a cylindrical portion or cylindrical projection 7b (such as a smaller cylindrical portion) on a first (right) side confronting the frame member 5. The cylindrical portion 7b is an annular projection including an inside circumferential surface formed with internal teeth serving as an internal gear 7a. The cylindrical portion 7b of cover member 7 is fit coaxially and rotatably in the rim portion 5j (in the circular recess 5a) of frame member 5. The outer circumferential portion 7h of cover member 7 surrounds a center portion 7s having a center wall surface facing in a first (rightward) direction toward the frame member 5 and confronting the center wall surface 5e of base member 5. Thus, the outer circumferential portion 7h of cover member 7 is fit rotatably in the outer circumferential portion 5h (5j) of frame member 5.

Figure 1:
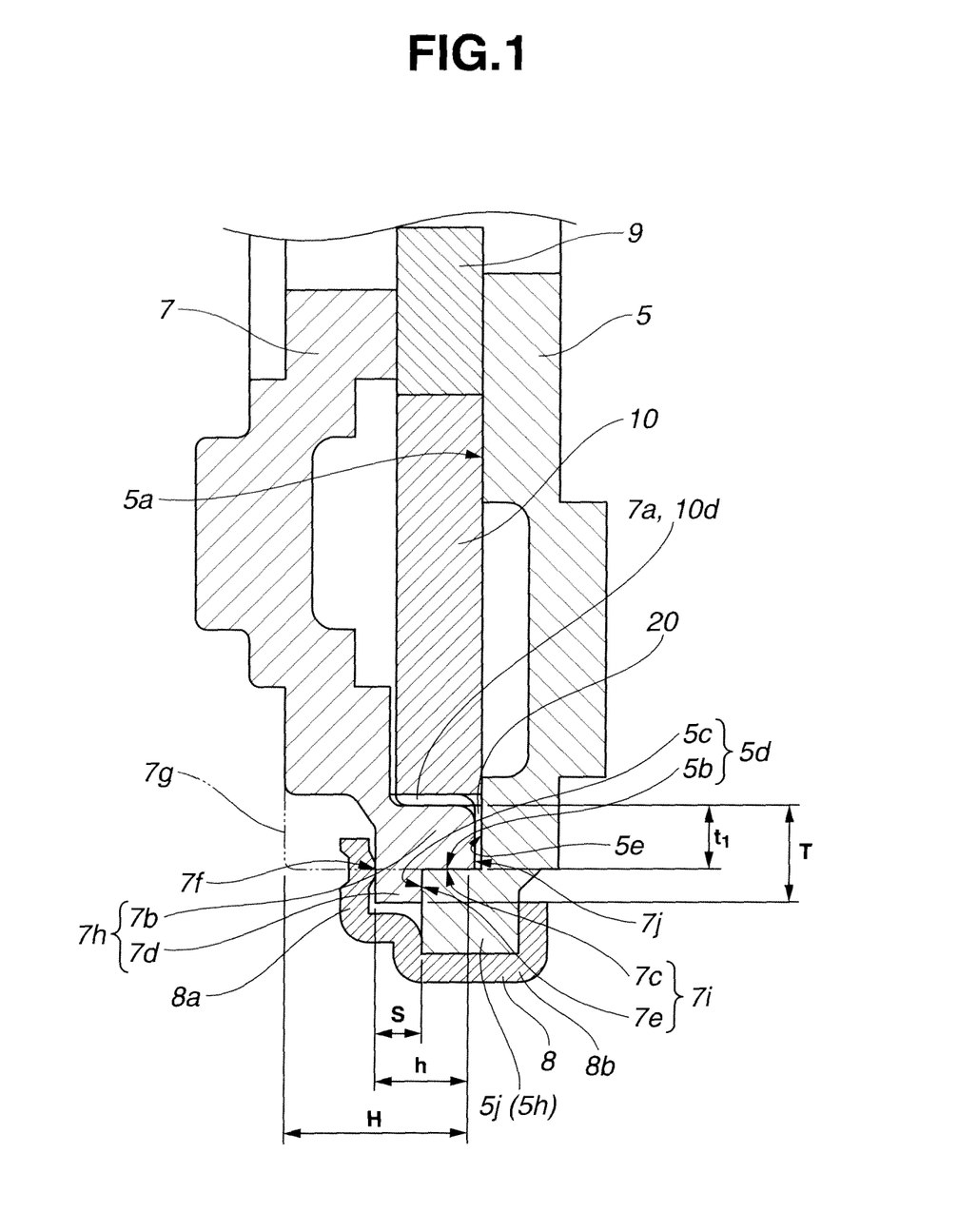
FIG. 1 is an enlarged sectional view showing a main portion of a vehicle seat reclining mechanism according to a first embodiment, shown in FIGS. 2A and 2B.

FIG. 1 shows, in close-up, a main portion of FIG. 2B. The cylindrical portion 7b of cover member 7 includes an outside circumferential or cylindrical surface 7c slidably fit in an inside circumferential or cylindrical surface 5b of the rim portion 5j in a manner to limit radial movement of cover member 7 relative to frame member 5. The outside circumferential surface 7c serves as a sliding outside circumferential surface. The outer circumferential portion 7h of cover member 7 further includes a flange or flange portion 7d (or first flange portion) projecting radially outwards on a second side (or anti-frame side)(the left side as viewed in FIG. 1 and FIG. 2B) of the sliding outside circumferential surface 7c of cylindrical projection 7b.

Flange portion 7d of cover member 7 includes a first side surface 7e facing in the first (axial) direction toward frame member 5 and a second side surface 7f facing, away from frame member 5, in the second (axial) direction opposite to the first (rightward) axial direction. The first (right) side surface 7e of flange portion 7d is in sliding contact with a confronting surface 5c of the outer circumferential portion 5h (5j) of frame member 5, and serves as a sliding side surface or a sliding flat surface for limiting axial movement of cover member 7 relative to frame member 5. The confronting surface 5c is a surface facing in the second axial direction, and the confronting surface 5c of this example is an end surface of the rim portion 5j. Thus, the first side surface 7e of flange portion 7d faces in the first axial direction (rightward direction as viewed in FIG. 1 and FIG. 2B), whereas the confronting (end) surface 5c of frame member 5 faces in the second axial direction (leftward direction) opposite to the first axial direction, and confronts the first side surface 7e.

The cylindrical portion 7b of cover member 7 projects in the first (rightward) axial direction and includes a first side surface 7j facing in the first axial direction and a second side surface facing in the second (leftward) axial direction. The first side surface 7j serves as an end surface facing toward the bottom surface 5e (confronting surface) of the circular recess 5a. In this embodiment, the end surface 7j of cylindrical projection 7b is spaced axially from the bottom surface 5e (confronting surface) by a clearance 20. In the example shown in FIG. 1, the second side surface of cylindrical portion 7b extends continuously from the second side surface 7f of flange portion 7d so as to form a single (flat) surface (7f) facing in the second axial direction.

A holder 8 is a ring-shaped annular member serving as a regulating member for regulating or limiting axial movement of cover member 7 relative to frame member 5. Holder 8 includes a first side portion 8b having a shape bent so as to pinch the outer circumferential portion 5h (5j) of frame member 5 axially from both sides. Holder 8 includes a second side portion 8a (or forward end portion) bent radially inward and extending radially inward. The second side portion 8a has an inner surface which faces axially (in the first axial direction) toward the outer circumferential portion 7h of cover member 7. The inner surface of second side portion 8a is in sliding contact with the outer circumferential portion 7h of cover member 7, and functions to limit axial movement of cover member 7. Thus, holder 8 holds the frame member 5 and cover member 7 together in a manner to prevent the frame member 5 and cover member 7 from moving axially away from each other, and to allow relative rotation between frame member 5 and cover member 7.

In the case of forming the cylindrical portion 7b by press forming in the half blanking mode, the forming process of the half blanking requires a greater radial wall thickness T (thickness of plate). However, it is possible to reduce the required radial wall thickness from the greater thickness value T to a smaller thickness value t1 determined by a required strength, by forming the cylindrical portion by a forming method such as forging. In the case of the production method such as forging, however, the cylindrical portion 7b is elongated axially in the second (leftward) axial direction, and there is formed an extended cylindrical portion 7g shown by a two-dot chain line in FIG. 1. Therefore, holder 8 is required to hold the extended portion 7g with the second side portion 8a by sliding on the side surface of extended portion 7g. In this embodiment, by contrast, the flange portion 7d is formed in the outer circumference portion 7h of cover member 7. Therefore, it is possible to remove the extended portion 7g and to reduce the axial thickness of the cylindrical portion 7b to a smaller thickness value (h) determined by the required strength. Flange portion 7d provides the sliding regulation surface 7f of a sufficient area for sliding contact with the second side portion 8a of holder 8.

A cam 9 of a rotary type is disposed axially between base member 5 and cover member 7. The cam 9 is located at the center of a circular inside cavity or space which is defined axially between the center portion 5s of base member 5 and the center portion 7s of cover member 7, and which is surrounded by the outer circumferential portion 7h of cover member 7 and the outer circumferential portion of base member 5. In this example, the circular inside cavity is defined axially between the center wall surface 5e of base member 5 and the center wall surface of cover member 7, and the center wall surface 5e of base member 5 is the bottom surface of circular recess 5a. The center wall surface 5e of base member 5 is a flat surface facing in the second axial (leftward) direction. The center wall surface of cover member 7 is a flat surface facing in the first axial (rightward) direction, and confronting the confronting surface 5e of base member 5.

A lock tooth member 10 is also disposed axially between the center portions 5s and 7s of base member 5 and cover member 7. In this example, the lock tooth member 10 is composed of first and second lock tooth blocks 10 which are arranged at diametrically opposite positions across the cam 9 in the circular inside cavity between the center wall surfaces of base member 5 and cover member 7. Each of the first and second lock tooth blocks 10 is guided by a shaft portion 11 and first and second guide projections 12A and 12B (a pair of guide portions) which are formed integrally in base member 5. The shaft portion 11 and first and second projections 12A and 12B for each of the lock tooth blocks are constructed in the following manner.

The shaft portion 11 is a columnar portion having a semi-circular cross section. Shaft portion 11 is formed integrally in base member 5. The corresponding lock tooth block 10 is swingable along a curved path or an arc path curved in the form of a circular arc. Shaft portion 11 includes an inner guide surface 11a on the inner side of the arc path. The lock tooth block 10 includes a bearing surface 10c which is a concave surface formed by cutout of a circular arc shape. The first and second guide projections 12A and 12B are formed integrally in base member 5, on the outer side of the arc path. First and second guide projections 12A and 12B include first and second outer guide surfaces 12a and 12b, respectively. The lock tooth block 10 includes a first sliding outer circumferential surface 10a in sliding contact with the first outer guide surface 12a, and a second sliding outer circumferential surface 10b in sliding contact with the second outer guide surface 12b. The first and second guide surfaces 12a and 12b and the first and second sliding surfaces 10a and 10b are curved surfaces curved in the form of circular arcs extending coaxially about a center axis of the shaft portion 10 so as to enable the swing motion of the lock tooth block 10 along the arc path. The lock tooth block 10 includes an external gear or external toothed portion 10d capable of engaging with the internal gear 7a or one of the internal toothed portions 7a.

The cam 9 is arranged to force the lock tooth blocks 10 each formed with the external gear 10d radially outwards toward the internal gear 7a which, in this example, includes a first internal toothed portion for engaging with the external gear 10d of the first lock tooth block 10 and a second internal toothed portion for engaging with the external gear 10d of the second lock tooth block 10. When cam 9 is rotated in the counterclockwise direction as viewed in FIG. 2A, about the center axis in a center hole 9e, the first and second lock tooth blocks 10 are pushed radially outwards in the opposite radial directions. Thus, cam 9 makes it possible to engage external gear 10d with internal gear 7a, and to disengage external gear 10d from internal gear 7a. When external gear 10d is engaged with internal gear 7a, the seat reclining mechanism prevents rotation of the rotation member 7 relative the base member 5 and thereby holds the seat back 3 at a predetermined angular position relative to the seat cushion.

Cam 9 includes first and second lock cam surfaces 9a for swinging the lock tooth blocks 10 in the clockwise direction, respectively, to engage the external gear 10d with the internal gear 7a, and first and second unlock cam surfaces 9b for swinging the lock tooth blocks 10 in the counterclockwise direction, respectively, to disengage the external gear 10d from the internal gear 7a. Cam 9 further includes first and second sliding outer circumferential surfaces 9c for regulating movement of cam 9 along an imaginary straight line L2 (diametrical line) which is substantially perpendicular to an imaginary straight line L1 (diametrical line) connecting the first and second lock cam surfaces 9a. First and second sliding outer circumferential surfaces 9c are located on the line L2. Each of first and second sliding outer circumferential surfaces 9c is a curved surface curved in the form of a circular arc around the center line of center hole 9e of cam 9. Each of first and second sliding outer circumferential surfaces 9c is always held in sliding contact with a sliding surface 12d formed in the corresponding one of guide projections 12A and 12B.

At least one lock spring 13 is provided for urging the cam 9 rotationally in the counterclockwise direction so as to urge each of the lock tooth blocks 10 in the direction to the engagement between external gear 10d with internal gear 7a. In this example, there are two of the lock springs 13. Each of lock springs 13 extends from a base end attached to a projection 14 of a semi cylindrical columnar shape formed integrally with base member 5, to a forward end retained by a spring retaining portion 9d formed in the outer circumference of cam 9.

A connecting shaft 16 shown in FIG. 2B extends in a widthwise direction, and connects left and right seat reclining mechanisms 1 provided on the left and right sides of seat cushion 2. A vehicle seat reclining apparatus includes at least one of the left and right seat reclining mechanisms each mechanism has the construction shown in FIGS. 1, 2 and 6, as explained above. An operation shaft 15 is forcibly fit and fixed in the center hole 9e of cam 9 of each of the left and right seat reclining mechanisms 1. The connecting shaft 16 is a hollow shaft includes a left end portion fitting over an inner end portion of the operation shaft 15 of the left side reclining mechanism 1, and a right end portion fitting over an inner end portion of the operation shaft 15 of the right side reclining mechanism 1. On each of the left and right sides, the left or right end portion of the hollow connecting shaft 16 is coupled with the inner end portion of the left or right operation shaft 15 by engagement between external serration 15a formed in the outside circumferential surface of the inner end portion of the operation shaft 15 and internal serration 16a formed in the inside circumferential surface of the end portion of hollow connecting shaft 16. Thus, each of the operation shafts 15 rotates as a unit with the connecting shaft 16.

As shown in FIG. 2B, the operation shaft 15 includes an outer end portion having serration 15b and projecting outwards from the base plate 4 shown in FIG. 6. An operation lever 17 shown in FIG. 6 is connected with the operation shaft 15 through the serration 15b. An operation knob or grip 18 is attached to operation lever 17. Therefore, a seat occupant can rotate the operation shafts 15 on both sides by rotating the operation lever 17 on one side.

The thus-constructed vehicle seat reclining apparatus is operated as follows. In the assembled state in which the seat reclining mechanism 1 is installed in the seat on each of the left and right sides, the cam 9 is normally held in a position by the lock springs 13 urging cam 9 in the counterclockwise direction. Therefore, each of the lock tooth blocks 10 is held in the lock position by being pushed by the corresponding lock cam surface 9a, and rotated in the clockwise direction along the arc path defined by the corresponding shaft portion 11 and first and second outer guide surfaces 12a and 12b. At this lock position, the external gear 10d engages with the internal gear 7a of cover member 7, and thereby prevents rotation of seat back 3.

When the operation shaft 15 is rotated in the clockwise direction in FIG. 6 by using the operation knob 18 against the resilient force of lock springs 13, each lock tooth block 10 is disengaged from the corresponding lock cam surface 9a of cam 9, and pushed in an opposite direction by the corresponding unlock cam surface 9b. Therefore, each lock tooth block 10 is rotated in the counterclockwise direction on the corresponding shaft portion 11, to the unlock position at which the external gear 10d is disengaged from the internal gear 7a. At this unlock position, the seat back 3 to which the cover member 7 is attached through arm plate 6 is rotated forwards by the resilient force of a spring (not shown), in a direction toward a posture of forward inclination.

When the seat back 3 is rotated rearwards in the direction toward a backward leaning position against the force of the spring (not shown), and the operation knob 18 is released at a desired angular position of seat back 3, then the cam 9 is rotated in the counterclockwise direction by the spring force of lock springs 13, and each lock tooth block 10 is pushed in the clockwise direction by the corresponding lock cam surface 9a. Therefore, the external gear 10d engages with the internal gear 7a, and the seat reclining mechanism 1 is restored to the lock state.

Figure 2A:
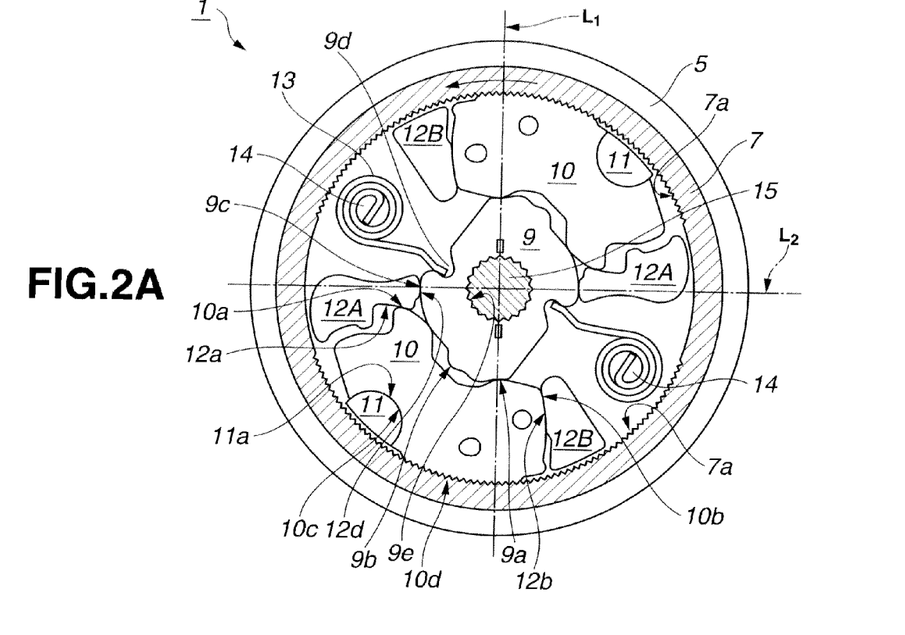
FIG. 2A is a view partly broken, showing the vehicle seat reclining mechanism.
Figure 2B:
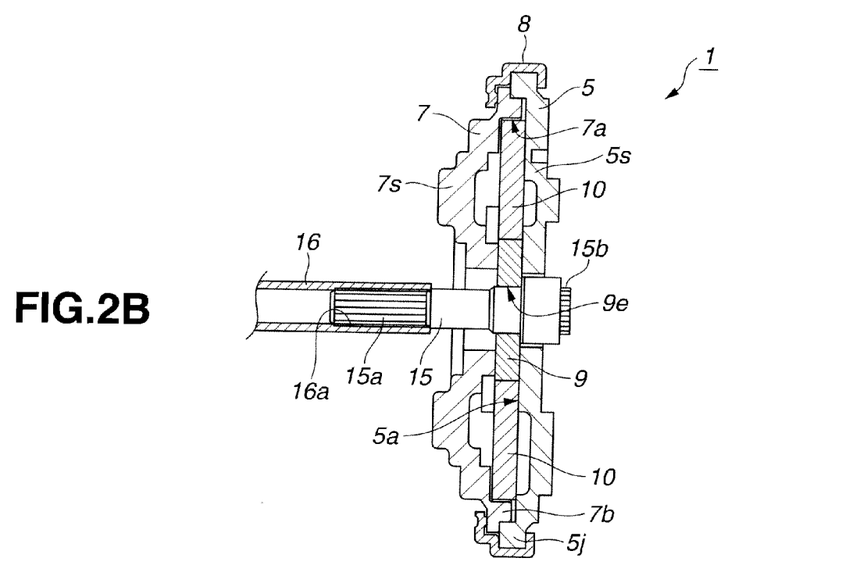
FIG. 2B is a sectional view of the vehicle seat reclining mechanism of FIG. 2A.

When a forward load is applied to the seat back 3 shown in FIG. 6 in a direction toward forward inclination, the cover member 7 tries to rotate in the counterclockwise, as shown by an arrow in FIG. 2A, relative to the base member 5 and the rotational force is transmitted through the engagement between the internal gear 7a and external gear 10d, to the lock tooth blocks 10. Therefore, each lock tooth block 10 tries to rotate in the counterclockwise direction in FIG. 2A. In this case, the lock tooth block 10 is supported by cam 9, shaft portion 11 and second guide projection 12B.

As mentioned before, cover member 7 includes flange portion 7d projecting radially outwards from cylindrical portion 7b. In this example, flange portion 7d is formed by cutting or cutting work of the outer circumferential portion initially having a rectangular cross sectional shape formed by half blanking of press working. Therefore, it is possible to reduce the radial wall thickness of cylindrical portion 7b from an initial thickness T of the outer circumferential portion having the rectangular cross section before the cutting operation, to a smaller wall thickness t1. The smaller wall thickness t1 is set equal to a thickness required by the required strength of cylindrical portion 7b, rather than a thickness (T) required by the press working. It is optional to form the cylindrical portion 7b and flange portion 7d by forging instead of the press forming and cutting.

As a method for forming the cylindrical portion having the thickness t1, there is known the press forming, drawing or drawing stamping. In this case, the cylindrical portion 7b is elongated in the leftward direction in FIG. 1. Therefore, there is formed the extended cylindrical portion 7g shown by a two-dot chain line, and the holder 8 is required to have a sufficient axial width to hold the outer cylindrical portion which includes the extended portion 7g and having a greater axial thickness H. According to the embodiment of the present invention, by contrast, the sliding regulation surface 7f is formed by the second side surface of the flange portion 7d, instead by the second side surface of the extended portion 7g, and the extended portion 7g is not required, so that the axial width of cylindrical portion 7b can be reduced from the greater value H to the small value h.

In the case of the production method of forming the cylindrical portion 7b by forging, it is possible to use the material of extended portion 7g, as the material of flange portion 7d. Moreover, since the axial width of cylindrical portion 7b is reduced from H to h, the axial width S of flange portion 7d is reduced, the axial position of the sliding regulation surface 7f becomes closer to the frame member 5, and the axial distance from the end surface 5c of rim portion 5j of frame member 5 to the second side portion 8a of holder 8 for abutting slidably on the sliding regulation surface 7f is decreased.

In this embodiment, the sliding regulation surface 7f is formed in the flange portion 7d. Therefore, it is possible to reduce the radial thickness of cylindrical portion 7b to t1 Accordingly, it is possible to reduce the inside diameter of inside circumferential surface 5b of rim portion 5j (5h) of frame member 5. In the case of the outer circumferential portion 7h including only the cylindrical portion 7b, formed by the press forming or drawing, the radial thickness of cylindrical portion 7b can be decreased to t1, and hence the outside diameter of cover member 7 can be reduced. However, in this case, the axial width of the cylindrical portion 7b is increased to "H", and accordingly, the axial dimension of holder 8 is increased. On the other hand, the outer circumferential portion including only cylindrical portion 7b is formed by half blanking, the axial width of cylindrical portion 7b can be decreased to "h" and accordingly the axial length of holder 8 can be decreased, However, in this case, the radial wall thickness of cylindrical portion 7b is increased to the greater thickness "T" required by the half blanking, beyond the thickness in the case of the press forming or drawing.

In this embodiment, the outer circumferential portion 7h of cover member 7 is formed with flange portion 7d projecting radially outwards from cylindrical portion 7b, and the second side surface of flange portion 7d is used as the sliding regulation surface 7f on which the second side portion 8a of holder 8 slides. Therefore, it is possible to ensure the sliding regulation surface of a sufficient area, and it is further possible to decrease the radial wall thickness of cylindrical portion 7b, and hence to decrease the inside diameter of the inside circumferential surface 5b of rim portion 5j of frame member 5 in which the cylindrical portion 7b is fit. As a result, it is possible to reduce the size of the seat reclining mechanism 1.

Moreover, by decreasing the axial length of holder 8, it is possible to reduce the amount of flexural deformation at the time of axial load applied between cover member 7 and frame member 5, and to reduce the amount of axial displacement of cover member 7 relative to frame member 5. Therefore, this embodiment can prevent unsteady movement of seat back 3 in the left and right direction, and to prevent a decrease of the lock strength due to separation between frame member 5 and cover member 7. Thus, it is possible to decrease the radial dimension of the seat reclining mechanism and to increase the strength.

Cover member 7 includes a recessed corner 7i formed by the sliding outside circumferential (cylindrical) surface 7c of cylindrical portion 7b and the flat first side surface (sliding side surface) 7e of flange portion 7d intersecting each other so as to form a right angle as shown in the sectional view of FIG. 1. On the other hand, frame member 5 includes a projected corner 5d formed by the inside circumferential (cylindrical) surface 5b of rim portion 5j and the flat end surface 5c intersecting each other so as to form a right angle as shown in the sectional view of FIG. 1. The projected corner 5d of frame member 5 is fit slidably in the recessed corner 7i of cover member 7. Therefore, the fitting arrangement of projected corner 5d and recessed corner 7i ensures smooth sliding rotation between cover member 7 and frame member 5 and prevent rattling movement of cover member 7 relative to frame member 5 in the axial direction and radial direction.

Second Embodiment

Figure 3:
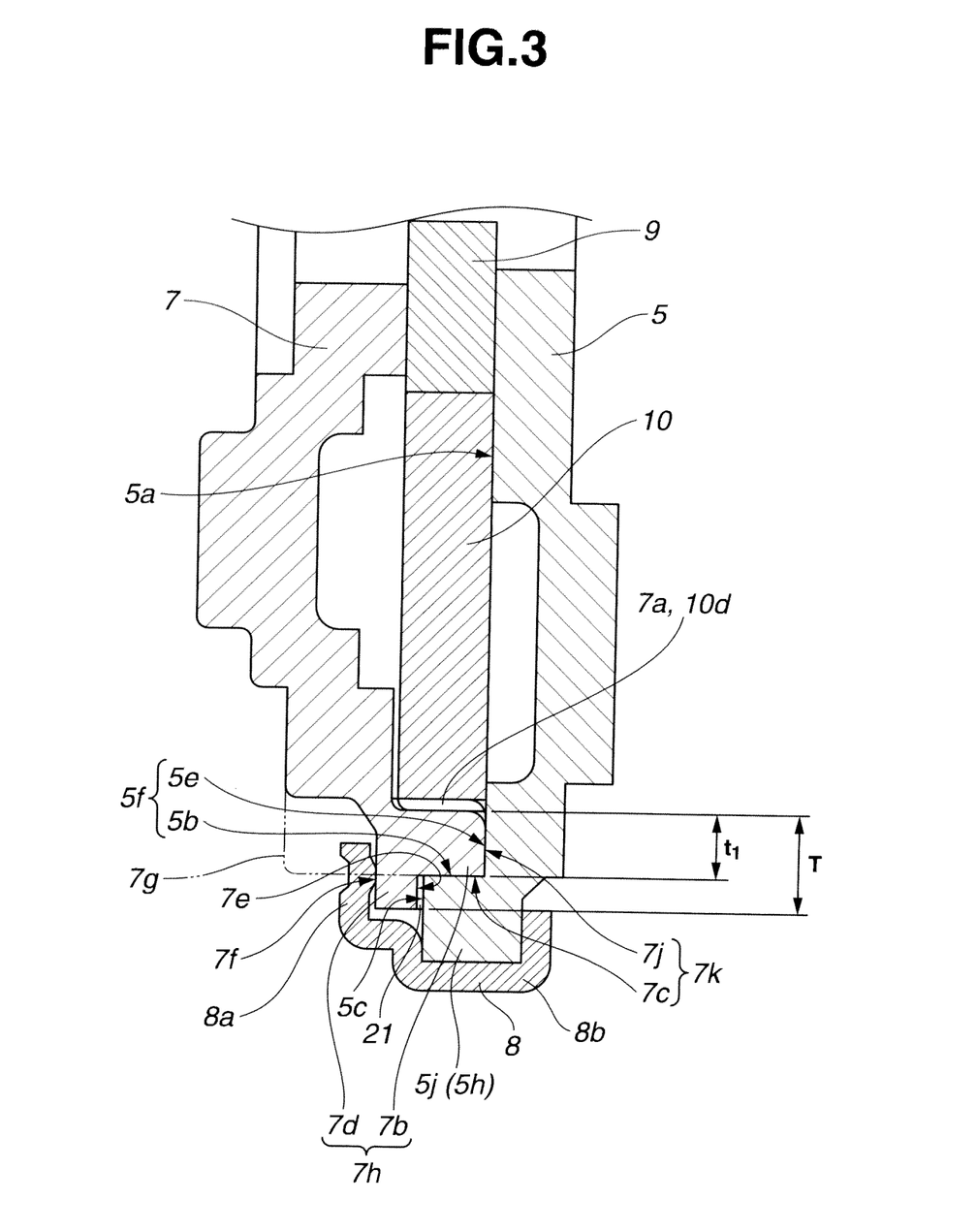
FIG. 3 is an enlarged sectional view similar to FIG. 1, but showing a main portion of a vehicle seat reclining mechanism according to a second embodiment.

FIG. 3 shows a vehicle seat reclining mechanism according to a second embodiment of the present invention. The second embodiment is basically the same as the first embodiment so that repetitive explanation is omitted by using the same reference numerals for the same parts. The following explanation is directed to feature of the second embodiment different from the first embodiment.

As shown in FIG. 3, the end surface 7j of the cylindrical portion 7b of cover member 7 is put in sliding contact with the bottom surface (confronting center wall surface) 5e of circular recess 5a of frame member 5. Thus, the end surface 7j is used as the (flat) sliding side surface. The first side surface 7e of flange 7d is spaced axially from the end surface 5c (confronting surface) of rim portion 5j of frame member 5 by a clearance 21. This clearance 21 is set to have a dimension (such as an axial dimension in the axial direction) to prevent contact between surfaces 7e and 5c even in the case of dimensional nonuniformity, and to prevent contact between surfaces 7e and 5c even in the case of undesirable relative movement between frame member 5 and cover member 7 such as a forced twisting movement.

Cover member 7 includes a projected corner 7k formed by the sliding outside circumferential (cylindrical) surface 7c of cylindrical portion 7b and the end surface (sliding side surface) 7j of cylindrical portion 7b intersecting each other so as to form a right angle as shown in the sectional view of FIG. 3. On the other hand, frame member 5 includes a recessed corner 5f formed by the inside circumferential (cylindrical) surface 5b of the outer circumferential portion 5h(5j) and the bottom surface (confronting center wall surface) 5e intersecting each other so as to form a right angle as shown in the sectional view of FIG. 3. The projected corner 7k of cover member 7 is fit slidably in the recessed corner 5f of frame member 5. Cover member 7 rotates slidingly relative to frame member 5 in the state in which the second side portion (regulating portion or forward end portion) 8a of regulating member 8 abuts slidingly on the sliding regulation surface 7f so as to limit axial movement of cover member 7. The fitting arrangement of projected corner 7k and recessed corner 5f ensures smooth sliding rotation between cover member 7 and frame member 5 as in the fitting arrangement of projected corner 5d and recessed corner 7i of FIG. 1.

In the seat reclining apparatus according to the second embodiment, the sliding side surface of the cover member 7 is the end surface 7j of cylindrical portion 7b of cover member 7 held in sliding contact with the bottom surface 5e of circular recess 5a of frame member 5. Thus, the cylindrical portion 7b of cover member 7 is axially bounded by the first side surface 7j and the sliding regulation surface 7f, and both side surfaces 7j and 7f of cylindrical portion 7b are put in sliding contact with the bottom surface 5e of frame member 5 and the inner side surface of first side portion 8a of holder 8, respectively. Moreover, the cylindrical portion 7b of cover member 7 is fit in the rim portion 5j(5h) of frame member 5, and the sliding outside circumferential (or cylindrical) surface 7c of cylindrical portion 7b of cover member 7 slides circumferentially on the inside circumferential surface 5b of rim portion 5j(5h) of frame member 5. Therefore, the cover member 7 can rotate relative to frame member 5 smoothly with no or little rattling or unsteady movement in the axial direction and the radial direction.

Third Embodiment

Figure 4:
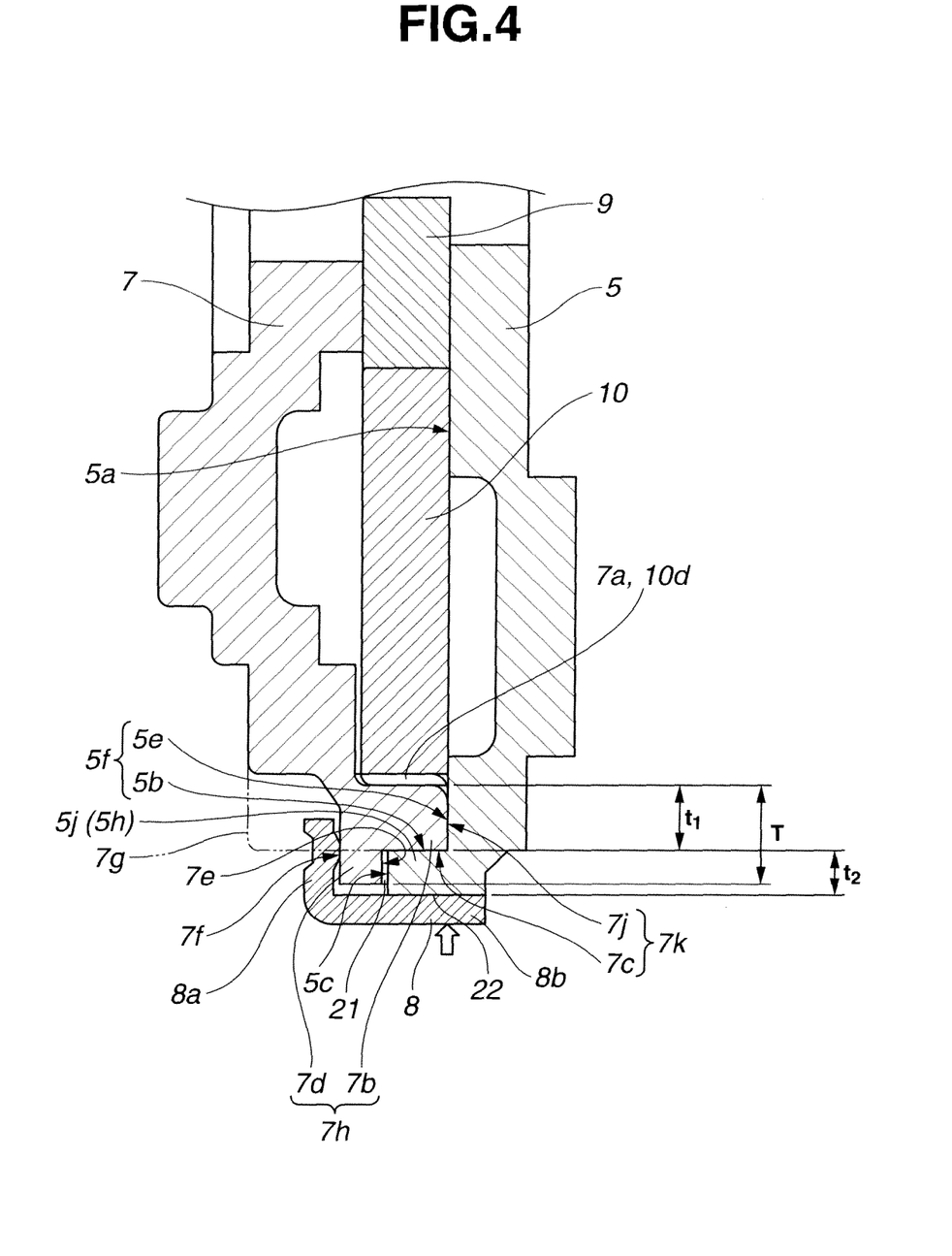
FIG. 4 is an enlarged sectional view similar to FIG. 1, but showing a main portion of a vehicle seat reclining mechanism according to a third embodiment.

FIG. 4 shows a vehicle seat reclining mechanism according to a third embodiment of the present invention. The third embodiment is basically the same as the second embodiment so that repetitive explanation is omitted by using the same reference numerals for the same parts. The following explanation is directed to feature of the third embodiment different from the second embodiment.

The seat reclining mechanism shown in FIG. 4 is different from the mechanism shown in FIG. 3 according to the second embodiment only in the structure connecting the first side portion 8b of holder 8 (regulating member) to the outer circumferential portion 5h(5j) of frame member 5 (base member). The first side portion 8b of holder 8 of FIG. 4 extends straight in the axial direction and has no first side radial wall extending radially inwards on the first (right) side of outer circumferential portion 5h(5j) of frame member 5 to clamp the outer circumferential portion 5h (5j), unlike the first side portion 8b of holder 8 shown in FIG. 3 (or FIG. 1) having the shape for clamping or pinching the outer circumferential portion 5h(5j) of frame member 5 axially from both axial sides. The first side portion 8b of FIG. 4 is fit over the rim portion 5j(5h) (larger cylindrical portion) of frame member 5, and joined to the outside circumferential surface of rim portion 5j(5h). In this example, the first side portion 8b of holder 8 is cylindrical, and the cylindrical first side portion 8b is fit over the outside cylindrical surface of rim portion 5j(5h) and joined to the outside cylindrical surface of rim portion 5j(5h) by laser welding. In this joining structure shown in FIG. 4, the rim portion 5j(5h) need not have a portion to be clamped axially by holder 8 as in FIG. 3 and FIG. 1. Therefore, the radial thickness of rim portion 5j can be reduced to a minimum thickness t2 determined by the required strength.

In the example shown in FIG. 4, the first side portion 8b of holder 8 is fit over rim portion 5j of frame member 5 by moving holder 8 axially from the second (left) side. Then, after positioning of holder 8 relative to rim portion 5j in the axial direction, the first side portion 8b of holder 8 is welded to the outside circumferential surface of rim portion 5j by laser welding directed in the radial direction as shown by a white arrow in FIG. 4, along the circumference of first side portion 8b of holder 8 around the center axis (9e) of frame member 5 and holder 8. In this case, sputter is produced by the laser welding along a small annular clearance 22 between the outside circumferential surface of rim portion 5j and the inside circumferential surface of first side portion 8b of holder 8, and particles of the sputter are splashed axially. In the structure shown in FIG. 4, however, the flange portion 7d of cover member 7 functions to restrain intrusion of sputter into the sliding portion between the inside circumferential surface 5b of frame member 5 and the sliding outside circumferential surface 7c of cover member 7.

In the seat reclining mechanism of FIG. 4 using the laser welding for joining the first side portion 8b of holder 8 to the outside circumferential surface of rim portion 5j, it is possible to minimize the outside diameter of the seat reclining mechanism, with reference to the diameter of the internal gear 7a, by setting the radial thickness of the cylindrical portion 7b of cover member to the minimum thickness (t1) required for the strength and setting the radial thickness of rim portion 5j of frame member 5 to the minimum thickness (t2) required for the strength. Moreover, the flange portion 7d of cover member 7 can protect the sliding portion between the inside circumferential surface 5b of frame member 5 and the sliding outside circumferential surface 7c of cover member 7, against sputter produced by the laser welding in the circumferential clearance 22, and thereby prevent the sliding performance between the frame member 5 and cover member 7 from being deteriorated by the employment of laser welding.

The clearance 21 between the end surface 5c of rim portion 5j and the side surface 7e of flange portion 7d is very narrow though it seems wide in the enlarged view of FIG. 4. In practice, for example, the outside diameter of holder 8 is 60~90 mm, and the axial dimension of the clearance 21 is set in the range of 0.2~0.5 mm. Therefore, sputtering particles can hardly enter the sliding portion of the sliding outside circumferential surface 7c and the inside circumferential surface 5b, through the clearance 21.

The before-mentioned patent document 3 shows (in FIG. 4) a structure including a ring-shaped holder including a first end portion joined to the outside circumference of a first member which is one of a frame to member and a cover member, by laser welding and a second end portion projecting radially inwards so as to hold a second member which is the other of the frame member and cover member axially. In this case, sputter of the laser welding can be splashed axially and directly into the sliding portion between the inside circumferential surface of the holder and the outside circumferential surface of the second member. By contrast, in the structure according to the third embodiment of the present invention, as shown in FIG. 4, the sliding outside circumferential surface 7c is not in sliding contact with the holder 8, and the flange portion 7d of cover member 7 acts to prevent sputter from reaching the sliding portion of the sliding outside circumferential surface 7c.

Fourth Embodiment

Figure 5:
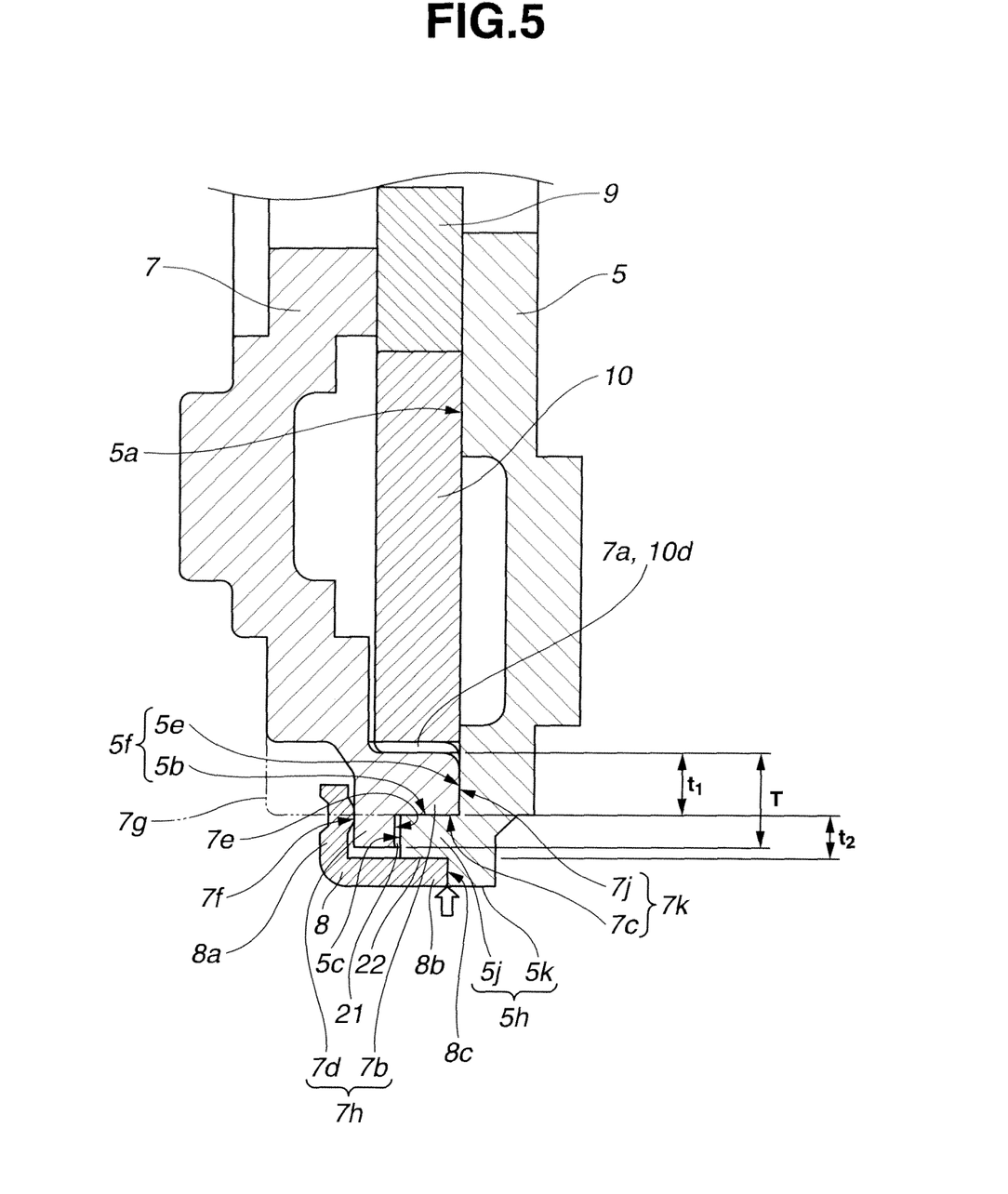
FIG. 5 is an enlarged sectional view similar to FIG. 1, but showing a main portion of a vehicle seat reclining mechanism according to a fourth embodiment.

FIG. 5 shows a vehicle seat reclining mechanism according to a fourth embodiment of the present invention. The fourth embodiment is basically the same as the third embodiment so that repetitive explanation is omitted by using the same reference numerals for the same parts. The following explanation is directed to feature of the fourth embodiment different from the third embodiment.

The seat reclining mechanism shown in FIG. 5 is different from the mechanism shown in FIG. 4 according to the third embodiment only in the structure connecting the first side portion 8b of holder 8 (regulating member) to the outer circumferential portion 5h(5j) of frame member 5 (base member). The outer circumferential portion 5h of frame member 5 shown in FIG. 5 includes a flange portion 5k projecting radially outwards from the rim portion 5j (larger cylindrical portion), and the holder 8 of FIG. 5 includes the first side portion 8b extending axially to an end 8c which abuts against a second side surface of the flange portion 5k of frame member 5 and which is joined to the second side surface of flange portion 5k of frame member 5 by a joining method such as laser welding. In the example of FIG. 5, the height of flange portion 5k of frame member 5 as measured in the radial direction is substantially equal to the radial wall thickness of first side portion 8b of holder 8. In the example of FIG. 5, the outside diameter of holder 8 is substantially equal to the outside diameter of flange portion 5k. The first side portion 8b of holder 8 shown in FIG. 5 is a cylindrical portion fits over the outside circumferential (or cylindrical) surface of rim portion 5j. The holder 8 of FIG. 5 includes the second side portion 8a extending radially inwards from a radial outer end to a radial inner end, and the first side portion 8b extending straight in the first (rightward) axial direction from the radial outer end of second side portion 8a, up to the end surface 8c which abuts axially on the flange portion 5k of frame member 5.

In the example shown in FIG. 5, the first side portion 8b of holder 8 is fit over rim portion 5j of frame member 5 axially. Then, in the state in which the end surface 8c of first side portion 8b of holder 8 abuts against the flange portion 5k of frame member 5, and thereby determines the axial position of holder 8, the end surface 8c of first side portion 8b of holder 8 is welded to the to second (left) side surface of flange portion 5k of frame member 5 by laser welding directed in the radial direction as shown by a white arrow in FIG. 5, along the circumference of first side portion 8b of holder 8 around the center axis (at 9e) of frame member 5 and holder 8. In this case, it is possible to reduce the output of the laser required for welding as compared to the welding of irradiation of laser from the outside circumference surface of holder 8, and hence to reduce the amount of sputter. Moreover, the flange portion 5k facilitates the operation of positioning the holder 8 axially. Sputter is produced mostly at the abutment between the end surface 8c of first side portion 8b of holder 8 and the second side surface of flange portion 5k of frame member 5, so that it is possible to reduce the amount of sputter entering the circumference clearance 22.

The seat reclining mechanism of FIG. 5 can provide the following advantages in addition to the advantages of the third embodiment. The flange portion 5k of outer circumferential portion 5h of frame member 5 facilitates the operation of positioning the holder 8 axially by abutment with the end surface 8c of holder 8. The welding between the end surface 8c of first side portion 8b of holder 8 and the side surface of flange portion 5k of frame member 5 is effective for reducing the amount of sputter produced in the circumferential clearance 22, and for preventing deterioration of the sliding performance due to the laser welding.

In the examples shown in FIG. 4 of the third embodiment and FIG. 5 of the fifth embodiment, the seat reclining mechanism is basically the same as the structure shown in FIG. 3, and the structure connecting the first side portion 8b of holder 8 (regulating member) to the outer circumferential portion 5h(5j) of frame member 5 (base member) is modified. However, it is optional to modify the seat reclining mechanism as shown in FIG. 1 of the first embodiment, to have the structure connecting the first side portion 8b of holder 8 (regulating member) to the outer circumferential portion 5h(5j) of frame member 5 (base member) as shown in FIG. 4 or FIG. 5. Furthermore, it is possible to set the outside diameter of flange portion 5k smaller than the outside diameter of holder 8.

In the examples of FIG. 4 and FIG. 5, the radial thickness or height of the flange portion 7d of cover member 7 is smaller than the radial thickness of the rim portion 5j, or the outside diameter of the flange portion 7d is smaller than the outside diameter of the rim portion 5j. Therefore, there is formed, between the outside circumferential surface of flange portion 7d and the inside circumference surface of the (cylindrical) first side portion 8b of holder 8, an annular space extending axially from the circumferential clearance 22. The radial spacing or width of this annular space is greater than the axial distance of the clearance 21 in the illustrated examples of FIG. 4 and FIG. 5.

In the illustrated examples according to the illustrated embodiments of the present invention, a seat reclining apparatus comprises a base member (such as frame member 5), a rotation member (such as cover member 7), and a regulating member (such as holder 8). The base to member is a member (such as a circular member or disc-shaped member) adapted to be connected or fixed to a first seat member that is one of a seat cushion and a seat back to be connected rotatably with the seat cushion. The rotation member is a member (such as a circular member or disc-shaped member) adapted to be connected or fixed to a second seat member that is the other of the seat cushion and the seat back. The rotation member is arranged to rotate relative to the base member and includes an internally-toothed portion or an internal gear. The regulating member is a member to regulate axial movement of the rotation member relative to the base member (in an axial direction along a rotation axis of the rotation member). The seat reclining apparatus further includes locking means or a locking setup, disposed (axially) between the base member and the rotation member, for locking and unlocking the rotation of the rotation member relative to the base member for allowing and inhibiting reclining movement of the seat back, by engaging and disengaging an external gear or externally-toothed portion, with and from the internal gear. The base member includes a circular recess, and the cover member includes a cylindrical portion or cylindrical projection rotatably fit in the circular recess. The rotation member further includes a flange portion which projects radially outwards from the cylindrical portion, and which is placed between the regulating member and the base member. In addition to these features, the seat reclining apparatus according to the illustrated embodiments of the present invention may further include any one or more of the following features (F1)~(F26).

(F1) The cylindrical portion of the rotation member includes a side surface facing away from the base member and serving as a sliding regulation surface facing axially to the regulating member and being in sliding contact with the regulating member. (F2) The cylindrical portion of the rotation member further includes a sliding outside circumferential surface arranged to slide on an inside circumferential surface of the circular recess of the base member and to limit radial movement of the rotation member relative to the base member. (F3) The rotation member further includes a sliding side surface and a sliding regulation surface for limiting axial movement of the rotation member relative to the base member. (F4) The flange portion of the rotation member is placed axially between the regulating member and a confronting surface (such as an end surface 5c) of the base member. (F5) The flange portion of the rotation member includes a side surface facing away from the base member and serving as the sliding regulation surface facing axially to the regulating member and being in sliding contact with the regulating member. (F6) The cylindrical portion of the rotation member includes an inside circumferential surface formed with the internal gear.

(F7) The flange portion of the rotation member is disposed axially between a regulating surface of the regulating member and the confronting (end) surface of the base member which confront axially each other across the flange portion.

(F8) The base member includes an outer circumferential portion surrounding the circular recess and including the inside circumferential surface and the confronting (end) surface of the base member. The outer circumferential portion of the base member may be an annular outer circumferential portion. (F9) The rotation member includes an outer circumferential portion including the cylindrical portion and the flange portion. The outer circumferential portion of the rotation member may be an annular outer circumferential portion. (F10) The regulating member is an annular member holding the outer circumferential portion of the base member and the outer circumferential portion of the rotation member together to prevent the rotation member from being separated axially relative to the base member. (F11) The locking setup (or locking means) (which may include a lock tooth member and a cam) is disposed axially between a center portion of the base member and a center portion of the rotation member, the center portion of the base member is surrounded by the outer circumferential portion of the base member, and the center portion of the rotation member is surrounded by the outer circumferential portion of the rotation member. (F12) The center portion of the base member includes a center wall surface facing in a second axial direction (toward the center portion of the rotation member) and the center portion of the rotation member includes a center wall surface facing in a first axial direction opposite to the second axial direction, toward the center wall surface of the base member. (F13) The circular recess of the base member opens toward the center wall surface of the rotation member and is bounded by the center wall surface of the base member (such as the bottom 5e of the circular recess 5a), and the inside circumferential surface (5b) included in the outer circumferential portion of the base member. (F14) The cylindrical portion of the outer circumferential portion of the rotation member projects in the first axial direction toward the center wall surface of the base member, includes the sliding outside circumferential surface which is fit rotatably in the inside circumferential surface of the annular outer circumferential portion of the base member, and the outer circumferential portion of the rotation member includes the sliding side surface which is a flat surface facing in the first axial direction, and the sliding regulation surface which is a flat surface facing axially in the second axial direction. (F15) The flange portion of the rotation member projects radially outwards from the cylindrical portion, and is located axially between the sliding regulation surface facing in the second axial direction, and the outer circumferential portion of the base member.

(F16) The cylindrical portion of the rotation member includes two opposite side surface which are a first side surface (such as a flat surface) facing in the first axial direction and a second side surface (such as a flat surface) facing in the second axial direction, the flange portion includes two opposite side surfaces which a first side surface (such as a flat surface) facing in the first axial direction and a second side surface (such as a flat surface) facing in the second axial direction, the second side surface of the flange portion (7d) and the second side surface of the cylindrical portion (7b) are connected continuously to form the sliding regulation surface (7f), and the sliding outside circumferential surface (7c) extends in the first axial direction from a first end from which the first side surface (7e) of the flange portion extends radially outwards (so as to form a recessed corner), to a second end from which the first side surface (7j) of the cylindrical portion extends radially inwards (so as to form a projected corner).

(F17) The regulating member includes a first side portion (8b) abutting on the outer circumferential portion (5h) of the base member (5) and a second side portion (8a) abutting on the outer circumferential portion (7h) of the rotation member (7), and the flange portion is disposed axially between the second side portion (8a) of the regulating member (8) and the outer circumferential portion (5h) of the base member. (F18) The cylindrical portion (7b) of the rotation member (7) includes a first side surface (7j) facing in a first axial direction toward a first confronting surface (5e) of the base member (5), the flange portion (7d) of the rotation member (7) includes a first side surface (7e) facing in the first axial direction toward a second confronting surface (5c) of the base member (5), and at least one of the first side surface of the cylindrical portion and the first side surface of the flange portion abuts axially against a corresponding one of the confronting surfaces (5e, 5c) of the base member (5).

(F19) The regulating member includes a first side portion (8b) fastened to the base member and a second side portion (8a) holding the rotation member (7) rotatably, and the flange portion (7d) of the rotation member (7) is disposed axially between the second side portion (8a) of the regulating member (8) and the base member (5). (F20) The first side portion (8b) of the regulating member (8) is fastened to the outer circumferential portion (5h) of the base member (5), the second side portion (8b) holds the outer circumferential portion (7h) of the rotation member (7) rotatably, and the flange portion (7d) of the rotation member (7) is disposed axially between the second side portion (8b) of the regulating member (8) and the outer circumferential portion (5h) of the base member (5).

(F21) The base member (5) includes a flange portion projecting radially outwards, and the regulating member (8)

includes a first side portion (8b) extending axially to an end surface (8c) which is joined to a side surface of the flange portion (5k) of the base member, and a second side portion (8a) extending radially inwards from the first side portion, and abutting axially on the sliding regulation surface (7f) of the rotation member (7). (F22) The base member (5) includes a rim portion (5j) including the insides circumferential surface (5b) defining the circular recess (5a) and an outer circumferential surface, the flange portion (5k) of the base member (5) projects radially outwards from the outside circumferential surface of the rim portion (5j), and the regulating member (8) includes the first side portion (8b) fitting over the outside circumferential surface of the rim portion (at 22).

(F23) The flange portion (7d) of the rotation member (7) includes a first side surface (7e) which is in sliding contact with a confronting surface (such as an end surface 5c) of the base member (5). (F24) The cylindrical portion (7b) of the rotation member includes a first side surface which is spaced from a confronting surface (such as a bottom surface 5e of the circular recess 5a) of the base member (5) (by an axial clearance 20).

(F25) The cylindrical portion (7b) of the rotation member (7) includes a first side surface (7j) which is in sliding contact with a confronting surface (5e) of the base member (5). (F26) The flange portion (7d) of the rotation member (7) includes a first side surface (7e) which is spaced from a confronting surface (5c) of the base member (5) (by an axial clearance 21).

This application is based on a prior Japanese Patent Application No. 2009-248411 filed on Oct. 29, 2009, and a prior Japanese Patent Application No. 2010-216761 filed on Sep. 28, 2010. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle seat reclining apparatus comprising:
   a base member which is to be connected to one of a seat cushion and a seat back connected rotatably with the seat cushion;
   a rotation member which is to be connected to the other of the seat cushion and the seat back, which is arranged to rotate relative to the base member and which includes an internal gear;
   a regulating member to regulate axial movement of the rotation member relative to the base member;
   a lock tooth member which includes an external gear capable of engaging with the internal gear and which is arranged to move between a lock position at which the external gear engages with the internal gear of the rotation member and an unlock position at which the external gear disengages from the internal gear; and
   a cam arranged to push the lock tooth member to move the lock tooth member between the lock position and the unlock position;
   wherein the base member includes an outer circumferential portion defining a circular recess, the rotation member includes an outer circumferential portion including a cylindrical portion which is fit rotatably in the outer circumferential portion of the base member, and which includes an inside circumferential surface formed with the internal gear, the cylindrical portion of the rotation member further includes a sliding outside circumferential surface to limit radial movement of the rotation member relative to the base member by being fit slidably in an inside circumferential surface of the outer circumferential portion of the base member, and the outer circumferential portion of the rotation member further includes a sliding side surface and a sliding regulation surface facing axially for limiting axial movement of the rotation member relative to the base member; and
   wherein the outer circumferential portion of the rotation member further includes a flange portion which projects radially outwards from the cylindrical portion, which is placed axially between the regulating member and the outer circumferential portion of the base member and which includes a side surface facing away from the base member and serving as the sliding regulation surface set in sliding contact with the regulating member;
   wherein the regulating member includes a first side portion fastened to the outer circumferential portion of the base member and a second side portion holding the outer circumferential portion of the rotation member rotatably.

2. The vehicle seat reclining apparatus as claimed in claim 1, wherein the flange portion of the rotation member is placed axially between a regulating portion of the regulating member and a confronting surface of the outer circumferential portion of the base member, the regulating portion of the regulating member being a portion abutting axially against the sliding regulation surface of the rotation member, and the outer circumferential portion of the base member being a portion surrounding the circular recess, fitting rotatably over the sliding outside circumferential surface of the rotation member, and including the confronting surface facing axially toward the flange portion of the rotation member.

3. The vehicle seat reclining apparatus as claimed in claim 1,
   wherein the regulating member is an annular member holding the outer circumferential portion of the rotation member to prevent the outer circumferential portion of the rotation member from being separated axially from the outer circumferential portion of the base member;
   wherein the lock tooth member and the cam are disposed axially between a center portion of the base member and a center portion of the rotation member, the center portion of the base member being a portion surrounded by the outer circumferential portion of the base member, the center portion of the rotation member being a portion surrounded by the outer circumferential portion of the rotation member, the center portion of the base member includes a center wall surface facing in a second axial direction and the center portion of the rotation member includes a center wall surface facing in a first axial direction opposite to the second axial direction, toward the center wall surface of the base member;
   wherein the circular recess of the base member opens toward the center wall surface of the rotation member and is bounded by the center wall surface of the base member, and the inside circumferential surface of the outer circumferential portion of the base member;
   wherein the cylindrical portion of the outer circumferential portion of the rotation member projects in the first axial direction toward the center wall surface of the base member, and the outer circumferential portion of the rotation member includes the sliding side surface which is a surface facing in the first axial direction, and the sliding regulation surface which is a surface facing in the second axial direction; and wherein the flange portion of the rotation member projects radially outwards from the sliding outside circumferential surface of the cylindrical portion, and is bounded axially between the side surface which is a second side surface facing in the second axial direction and serving as the sliding regulation surface and a first side surface facing in the first axial direction and confronting the confronting surface of the outer circumferential portion of the base member.

4. The vehicle seat reclining apparatus as claimed in claim 3, wherein the cylindrical portion of the rotation member is bounded axially between a first side surface facing in the first axial direction and a second side surface facing in the second axial direction, the second side surface of the flange portion of the rotation member and the second side surface of the cylindrical portion of the rotation member are connected continuously to form the sliding regulation surface of the outer circumferential portion of the rotation member, and the sliding outside circumferential surface extends in the first axial direction from a first end from which the first side surface of the flange portion of the rotation member extends radially outwards, to a second end from which the first side surface of the cylindrical portion of the rotation member extends radially inwards.

5. The vehicle seat reclining apparatus as claimed in claim 1, wherein the cylindrical portion of the outer circumferential portion of the rotation member includes a first side surface facing in a first axial direction toward a first confronting surface of the base member, the flange portion of the outer circumferential portion of the rotation member includes a first side surface facing in the first axial direction toward a second confronting surface of the base member, and at least one of the first side surface of the cylindrical portion and the first side surface of the flange portion of the outer circumferential portion of the rotation member abuts axially against a corresponding one of the confronting surfaces of the base member.

6. The vehicle seat reclining apparatus as claimed in claim 1, wherein the flange portion of the outer circumferential portion of the rotation member is disposed axially between the second side portion of the regulating member and the outer circumferential portion of the base member.

7. The vehicle seat reclining apparatus as claimed in claim 6, wherein the first side portion of the regulating member is fit over the outer circumferential portion of the base member and joined to the outer circumferential portion of the base member by laser welding.

8. The vehicle seat reclining apparatus as claimed in claim 1, wherein the outer circumferential portion of the base member includes a flange portion projecting radially outwards, and the regulating member includes a first side portion extending axially to an end surface which is joined to a side surface of the flange portion of the base member, and a second side portion extending radially inwards, and abutting axially on the sliding regulation surface of the rotation member.

9. The vehicle seat reclining apparatus as claimed in claim 8, wherein the outer circumferential portion of the base member includes a rim portion including the inside circumferential surface defining the circular recess and an outer circumferential surface, and the flange portion of the outer circumferential portion of the base member projects radially outwards from the outside circumferential surface of the rim portion, and the regulating member includes the first side portion fitting over the outside circumferential surface of the rim portion.

10. The vehicle seat reclining apparatus as claimed in claim 1, wherein the outer circumferential portion of the base member includes a flange portion projecting radially outwards, and having an outside diameter substantially equal to or smaller than an outside diameter of the regulating member and the regulating member includes a first side portion extending axially to an end surface which is joined to a side surface of the flange portion of the base member by laser welding.

11. The vehicle seat reclining apparatus as claimed in claim 1, wherein the flange portion of the outer circumferential portion of the rotation member includes a first side surface which is in sliding contact with a confronting surface of the outer circumferential portion of the base member.

12. The vehicle seat reclining apparatus as claimed in claim 11, wherein the cylindrical portion of the rotation member includes a first side surface which is spaced from a confronting surface of the outer circumferential portion of the base member.

13. The vehicle seat reclining apparatus as claimed in claim 1, wherein the cylindrical portion of the outer circumferential portion of the rotation member includes a first side surface which is in sliding contact with a confronting surface of the base member.

14. The vehicle seat reclining apparatus as claimed in claim 13, wherein the flange portion of the outer circumferential portion of the rotation member includes a first side surface which is spaced from a confronting surface of the base member.

15. The vehicle seat reclining apparatus as claimed in claim 1, wherein the side surface of the flange portion of the rotation member is flush with a side surface of the cylindrical portion of the rotation member, and the side surfaces of the flange portion and the cylindrical portion of the rotation member are connected continuously to form the sliding regulation surface which is a continuous flat surface facing axially away from the base member, and abutting on the regulating member, for limiting axial movement of the rotation member relative to the base member.

* * * * *